July 4, 1939.  F. A. CLARKE  2,164,447
COUPLING
Filed July 14, 1937  2 Sheets-Sheet 1
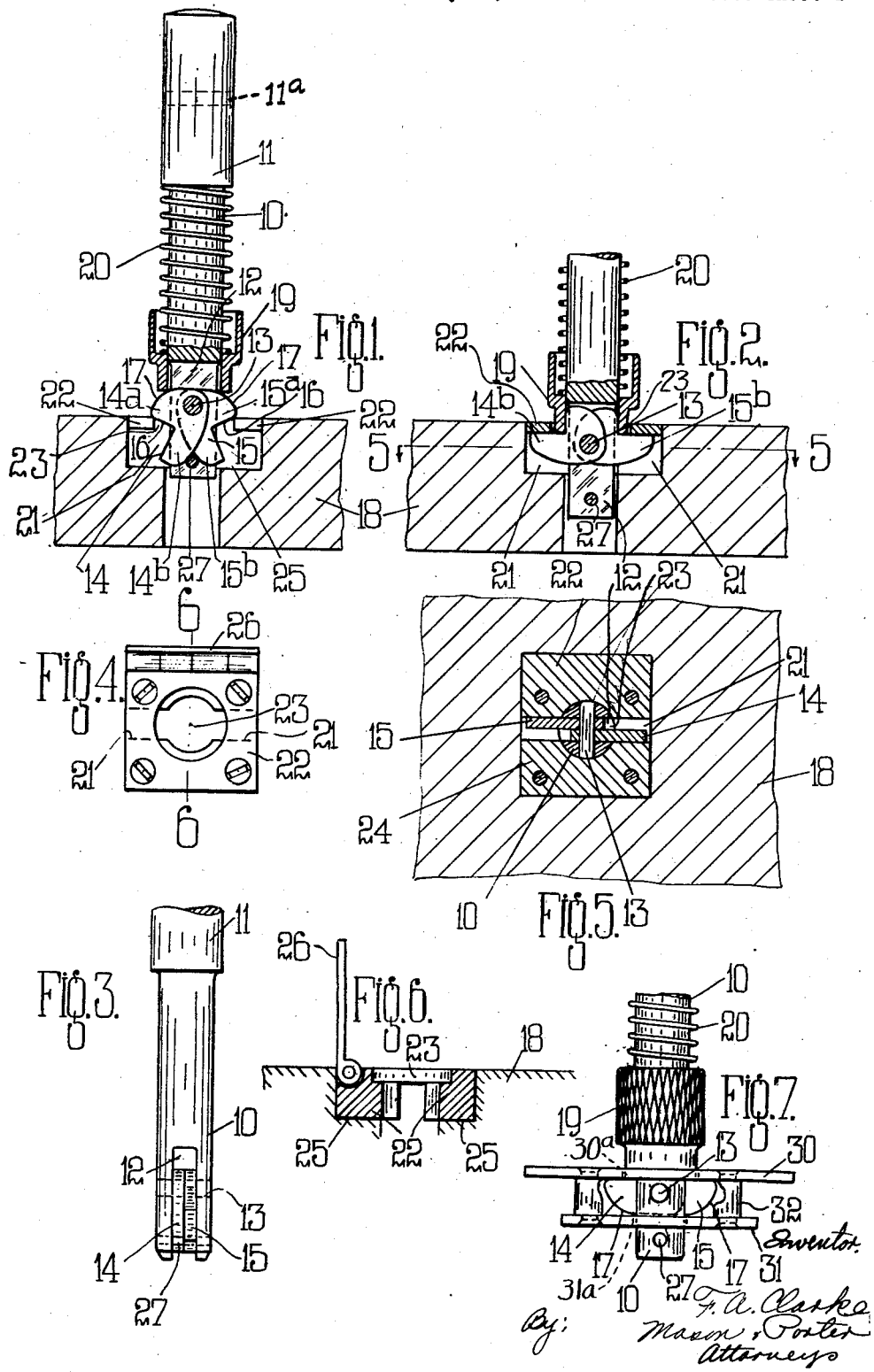

July 4, 1939.     F. A. CLARKE     2,164,447
COUPLING
Filed July 14, 1937     2 Sheets-Sheet 2
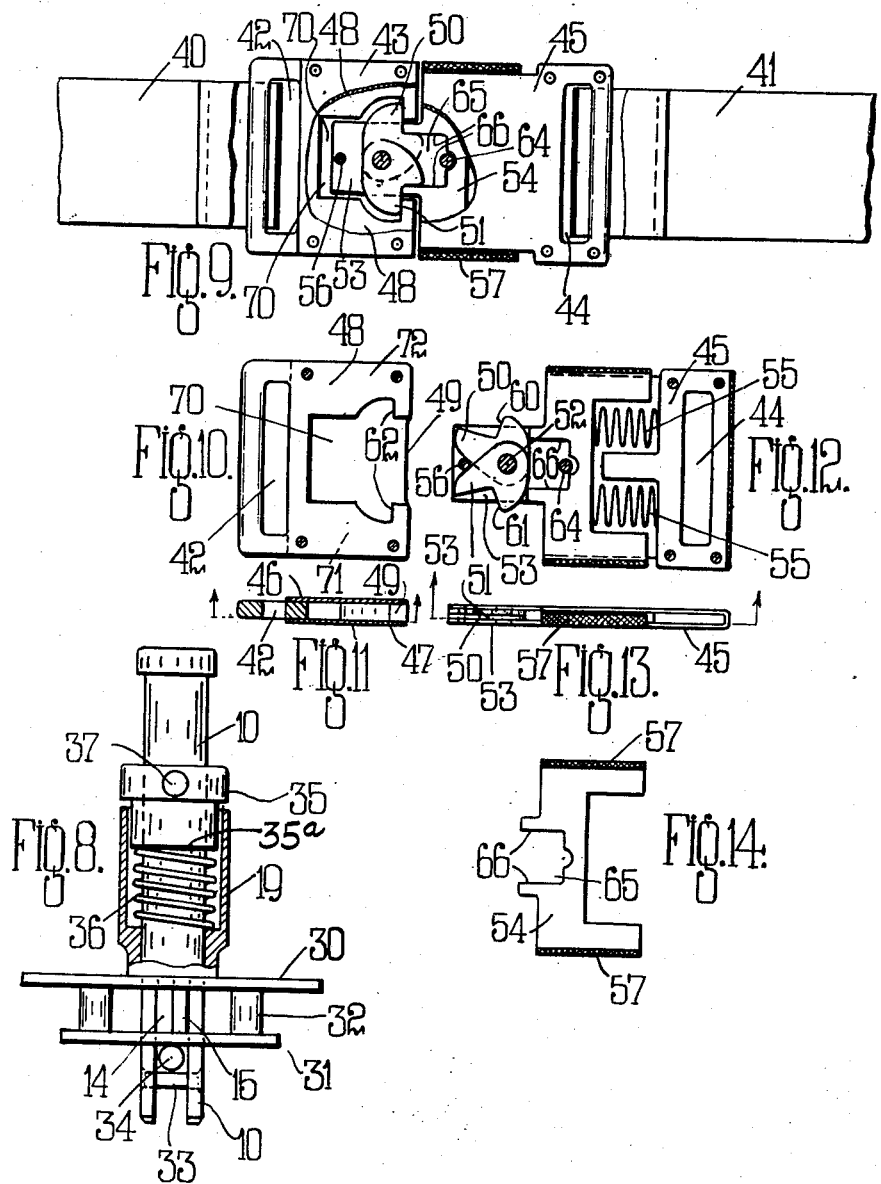

Patented July 4, 1939

2,164,447

UNITED STATES PATENT OFFICE 2,164,447

COUPLING

Frederick Arthur Clarke, Wembley, England

Application July 14, 1937, Serial No. 153,645
In Great Britain September 14, 1936

7 Claims. (Cl. 24—211)

The object of this invention is to provide a coupling which is automatic in action on bringing the elements thereof into engagement and which maintains the connection between the elements with reasonable certainty against possibility of accidental or inadvertent separation.

According to the present invention one of two members to be coupled has pivoted therein a pair of fingers, each having a shoulder thereon, and carries relatively longitudinally displaceable locking means in abutting relationship with said fingers, which pivotal fingers on engagement with the edges or a bounding wall of a socket in the other member are automatically angularly displaced, against a load applied to or by said locking means, into a position in rear of said edges where they are maintained by said locking means on simultaneous longitudinal movement thereof to a position shrouding the shoulders of said angular displaced fingers.

Further, by the present invention the fingers consist of right angled bell crank elements which have a common pivot on one of the members at their elbow parts, with one arm of each finger extending in opposite directions radially of said pivot.

In one form of construction the angular displacement of the fingers about their pivots is caused by engagement of the leading edges of the fingers with a wall of the socket in rear of the opening, whilst in a modified form of construction said angular displacement is effected by engagement of the shoulders of the fingers with the bounding edges of the socket opening.

Where the finger carrying member is vertical the collar under the action of gravity will maintain the fingers in position but where the finger carrying member is other than vertical or again, when it is vertical if desired, the collar may be resiliently loaded, that is to say it may be displaced out of its locking position only against the action of a load applied by resilient means such as a spring.

The locking means, whether in the form of a collar wholly shrouding one arm of each of the fingers to maintain these in their locking position, or in the form of a slide shrouding the edges only of said arms in said locking position, requires a light spring only to maintain it in said locking position, as said spring is operable in a direction at right angles to the load created by the shoulders of the fingers on said collar or slide when the two members are locked and a pull is applied in opposite directions on said members.

The invention is more particularly described with reference to the accompanying drawings, in which:—

Figure 1 is a view partly in section of one form of construction and showing the two members about to be coupled.

Figure 2 is a corresponding sectional view of the members coupled together with the fingers and the sleeve in their displaced position for maintaining the members coupled together.

Figure 3 is a side view of the member carrying the fingers, but with the sleeve and spring removed.

Figure 4 is a plan view of the socket member.

Figure 5 is a section on the line 5—5 of Figure 2.

Figure 6 is a section on the line 6—6 of Figure 4.

Figure 7 is a view of a slightly modified form of construction with the members in their locked position.

Figure 8 shows a further modified form of construction showing the edges as distinct from the faces of the locking members, i. e. is a view at right angles to those of Figures 1 and 7.

Figure 9 is a view of a still further modified form of construction in which the coupling is used for interconnecting two ends of a band or belt and is therefore relatively flat, the parts being broken away to show the fingers in their locked position within the socket member.

Figure 10 is a view of the socket member with one wall thereof removed to show the interior.

Figure 11 is a longitudinal sectional view of the socket member of Figure 10.

Figure 12 is a view of the other member carrying the pivotal fingers with one wall thereof removed to show the interior.

Figure 13 is a corresponding longitudinal sectional view.

Figure 14 is a view of the slide of Figure 12 for enabling the pivotal fingers to be displaced from their locking position and the members to be released when desired.

In the construction according to the drawings, a spindle 10 having an enlarged part 11, the position of which may be adjustable on the spindle, is diametrally slotted adjacent one end at 12, and has a pivot pin 13 for a pair of fingers 14, 15, passing through the bifurcated end formed by said slot.

The fingers 14, 15, consist of arms 14a, 14b, and 15a, 15b respectively and as will be seen from the drawings the arms are so disposed as to form right angled bell cranks with shoulders 16 constituted by one edge of each of the arms 14a, 15a.

The other edge of each arm 14a, 14b, 15a, 15b is curved at 17, the curvature being eccentric to the pivot pin 13.

The fingers 14, 15, are mounted on the pivot pin 13 in the region of their elbows with the arms 14a, 15a, extending in opposite radial directions from the pivot pin, and the arms 14b, 15b, extending in substantially the same longitudinal direction prior to engagement of the member 10 with the other member 18 of the coupling.

A collar or sleeve 19 is mounted for longitudinal displacement on the spindle 10 and is normally held, prior to coupling of the two members, against the curved edges 17 of the fingers by a compression spring 20, one end of which bears against the enlarged part 11 on the spindle and the other end of which is housed within a seating formed at one end of the collar or sleeve 19. The latter may be milled at its outer periphery to enable it to be readily gripped by the user and withdrawn towards the part 11 against the action of the spring.

The other member 18 of the coupling has a socket 21 extending in rear of an opening 23 of smaller diameter. The opening is formed in a plate 22 resting on members 24 between which are diametrically opposite recesses constituting the socket 21 extending radially outwardly from the opening 23 and beneath the lower face of the plate 22. The said members 24 rest on shoulders 25 formed in the member 18. A hinged cover 26 is provided to shroud the plate 22 and the opening 23 when the member 10 is uncoupled from the member 18, as in the case where, for example, the member 18 represents the deck of a ship and the member 10 is suitably connected to an article of furniture such as a deck chair, adapted to be temporarily retained in a predetermined position on the deck.

The end of the sleeve 19 adjacent the fingers 14, 15, is of an external diameter sufficiently small to enter the openings 23 as shown in Figure 2 when the fingers are in their locked position.

Where the coupling is required for the use described, the enlarged part 11 of the member 10 is transversely bored as at 11a to enable a flexible chain or the like means to be connected to the member 10.

A pin 27 is secured in position between the arms of the bifurcated end of the spindle 10 and in the path of pivotal movement of the fingers 14, 15, so as to constitute a stop for limiting the angular displacement of the fingers when moved inwardly from a locked to an unlocked position by relative displacement with the plate 22. This stop therefore prevents the fingers from moving across the longitudinal axis of the spindle so that when in an unlocked position the fingers are as shown in Figure 1, that is to say, the arm 15b can move outwardly to the right only and the arm 14b radially outwardly to the left.

In operation, in order to couple the spindle 10 to the member 18 a pressure is applied to the spindle in a direction towards the finger end when the fingers 14, 15 and the sleeve or collar 19 are in the position shown in Figure 1. Accordingly the shoulders 16 of the arms 14a, 15a, come into contact with the edges of the opening 23 formed in the plate 22. As the spindle 10 is moved further towards the member 18 the fingers are angularly displaced about their pivot pin 13 by engagement of the shoulders 16 on the arms 14a, 15a with the plate 22 and the sleeve or collar 19 is gradually retracted against the action of the spring 20. During said angular displacement of the fingers the arms 14b, 15b enter the radial slots 21 in rear of and on opposite sides of the central opening 23. When the fingers reach the position shown in Figure 2 the sleeve 19 is moved forward by the spring 20 and enters the opening 23 to shroud the shoulders 16 of the fingers and prevent angular displacement in the opposite direction of said fingers. So long as the fingers are prevented from angular displacement in the opposite direction by the sleeve or collar 19 the plate 22 prevents manual withdrawal of the coupling of the member 10 from the member 18.

It will thus be seen that to uncouple the members it is necessary to withdraw the collar or sleeve 19 against the action of the spring 20 whereupon the member 10 and the elements associated therewith may be removed from the member 18, initial movement causing angular displacement of the fingers 14, 15, in the opposite direction to that in which they were displaced during coupling.

Thus, the act of coupling is automatic with the application of pressure to the member 10 and uncoupling is automatic with the application of a pull on the collar 19 in a direction towards the free end of the member 10.

It is not essential to spring load the collar 19 should the member 10 lie substantially vertical as the weight of the collar alone under the action of gravity is sufficient to maintain it in a shrouding position about the shoulder 16 when the members are coupled together.

In the construction shown in Figure 7 the socket member consists of a pair of spaced plates 30, 31, interconnected by distance pieces 32 each of the plates having a central hole 30a, 31a formed therein through which the spindle 10 carrying the fingers 14, 15, is adapted to pass. In this particular construction the spacing apart of the plates 30, 31, with the latter constituting the base of the recess for the reception of the fingers, is small relatively to the effective radius of the fingers 14, 15, about their pivot pin with the result that angular displacement of the fingers 14, 15, about their common pivot pin on the spindle 10 is effected by the engagement of the curved faces 17 of the fingers with the plate 31. Accordingly this construction differs from that of Figure 1 primarily by virtue of the fact that the pivotal movement of the fingers is caused by the engagement of these with the base 31 of the recesses rather than by engagement of the shoulders 16 with the fingers of the inner walls of the socket member. Here again, the lower end of the sleeve 19 is adapted to enter the central hole 30a in the plate 30 when the fingers are in the locked position.

In the modified form of construction shown in Figure 8 the movement of the fingers is effected in the same manner as that according to Figure 7. In this particular construction, however, the bifurcated end of the spindle 10 carries a transverse pin 33 and said end passes sufficiently through the base plate 31 of the socket member to permit of the passage of a locking pin 34 between the transverse pin 33 and said base plate 31 after the fingers have been moved to their locked position between the plates 30 and 31.

If desired, however, this pin 34 may be omitted and a loose collar 35 provided on the spindle 10, a tension spring 36 extending between a shoulder within the sleeve 19 and the shoulder part 35a on the loose collar tending to force the latter upwardly. The loose collar 35 is locked in position to prevent upward displacement of the sleeve 19 and unlocking of the fingers 14, 15, by a locking pin 37 which is passed through the collar and into the spindle 10.

It will be appreciated that to enable the members to be unlocked the locking pin 37 must first be removed so as to permit of withdrawal of the sleeve 19 and pivotal movement of the fingers.

In the construction according to Figures 9 to 14 the principle of construction is similar to that of Figures 1–7 but the elements are flat so as to be utilised in interconnecting two ends 40, 41 of a band or belt. In this particular construction the end 40 of the belt is passed through an eyelet 42 at one end of a casing 43 constituting a socket member whilst the end 41 is passed through an eyelet 44 at one end of a casing 45 of the finger carrying member, the ends 40, 41, after being passed through the eyelets, are folded back upon themselves and secured by stitching or by rivets in the usual way so that the casing 43 is incapable of detachment from the end 40 and the casing 45 similarly incapable of detachment from the end 41 of the belt.

The casing 43 consists of spaced flat plates 46, 47, separated by a filling element 48 recessed at 70 as shown in Figure 10 for the reception of the pivotal fingers. An opening is provided in the casing at 49 for the passage therethrough and into the recess 70 of fingers 50, 51, pivotally mounted at 52 to the casing 45. This casing, as will be seen from Figure 9, is substantially rectangular but with a projection 53 at the central part of one transverse edge, the pivot pin 52 being carried by said projection 53 which like the casing 45 consists of plates slightly spaced apart to house the pivotal fingers 50, 51 and a sliding plate member 54. The width of the projection 53 is such that when the fingers are in their unlocked position, shown in Figure 12 the leading arms of the fingers lie within the bounding edges of the projection and the rear arms project slightly beyond the longitudinal edges of the projection. In this position of the fingers the slide 54 which is resiliently loaded by a pair of light springs 55 abuts against the curved faces of the fingers but with a force which is insufficient to cause pivotal movement of the fingers about their pivot pin 52.

The front and rear plates constituting the casing 45 are spaced apart by distance pieces or pins 56, 64, the former of which constitutes a stop for preventing the fingers from overlapping beyond the position shown in Figure 12, that is to say, the pin 56 functions in the same manner as the pin 27 of the constructions previously described.

The longitudinal side edges 57 of the sliding plate member 54 are flanged and project slightly beyond the longitudinal side edges of the casing 45. These flanges are milled, as clearly shown in Figure 14, so as to be gripped by the user to enable the slide to be withdrawn out of engagement with the fingers 50, 51, when it is desired to unlock the coupling between the ends 40, 41, of the band or belt. The front end of the sliding member is recessed at 65 to house those arms of the fingers 50, 51, on which the shoulders 60, 61 are provided, when the fingers are in their locked position, that is to say, with the leading arms extending radially outwardly from the position shown in Figure 9. In this position the side edges 66 of the recess 65 are engaged by the shoulders 60, 61 of the fingers and prevent reverse angular displacement of the fingers from the locked towards the unlocked position.

In operation, on bringing the casings 43, 45 together the projection 53 of the casing 45 first enters the opening 49 in the filling 48 to be followed by the fingers 50, 51 until the shoulders 60, 61 of said fingers engage with the bounding edges of the opening 49. Continued movement towards each other of the casings 43, 45, then causes angular displacement of the fingers about their common pivot pin 52 which in turn causes slight retraction of the sliding plate member 54 against the springs 55 until the leading arms of the fingers take up the position shown in Figure 9, that is to say, with the leading arms lying against the faces 62 of the filling 48 in the casing 43. In this position the sliding plate member 54, urged by its spring 55, moves forward so that its edges 66 engage about the shoulders 60, 61 of the fingers.

The fingers are now in a position in which they are incapable of being retracted until the sliding plate member 54 is withdrawn by engaging the milled edges 57 and moving the plate relatively to the casing 45.

Thus the sliding plate member 54 in the construction according to Figures 9–14 takes the place of the sleeve 19 in the constructions according to Figures 1–7.

If desired, the sliding plate member 54 may be replaced by a pair of sliding plates one for each finger, so that both plates must be withdrawn before both fingers are released from their locking position within the casing 48 thereby decreasing the risk of accidental withdrawal of the means for releasing the vehicles from their locked position.

Instead of causing angular displacement of the fingers 50, 51 by engagement of the shoulders 60, 61 with the bounding edges of the opening 49 the leading ends of the fingers in their unlocked position may slightly project laterally of the projection 53 in which event they may be engaged by the curved walls 71, 72 of the recess 70 in the socket member in which event the construction according to Figures 9–14 will operate in a manner similar to that of Figure 7.

The fingers in each construction according to the drawings may be frictionally or resiliently loaded to resist unintentional displacement, that is to say, the resilient load may be adapted to maintain the fingers in any position of adjustment thereby preventing the fingers from moving between their end positions without encountering the socket. In this way when the coupling members are separated there is no risk of the fingers taking up a position intermediate their end positions of displacement but on the contrary once the spindle 10 is withdrawn the fingers will remain in the relative position shown in Figures 1 and 12. This load may be provided by roughening the inter-engaging faces of the fingers over the small portions where they overlap in their unlocked position, or again a light spring may be provided between one of the fingers and its pivot pin 13 or 52 as the case may be.

From the foregoing description it will be seen that the sleeve 19 and the slide 54 each constitute in effect male members which cooperate with female socketed members. The sleeve 19 and the slide 54 have portions thereof which extend into the opening in the female member, as clearly shown in Figures 2 and 9, and these portions overlie the shoulders on the pivoted fingers when the coupling parts are locked together. Thus, any force tending to separate the coupling parts will be exerted by the fingers laterally against the sleeve 19 or the slide 54, as the case may be. The spring means is not, therefore, relied upon to maintain the coupling parts in position but, on the contrary, any force tending to separate the coupling parts is directed against the sleeve or the slide. The arms 14a, 15a of the fingers constitute locking arms, the shoulders 16 of which cooperate with the locking sleeve 19. The arms 14b, 15b constitute latching arms for maintaining the parts coupled together.

It is to be clearly understood that minor changes in the details of construction and arrangement of parts may be made without departing from the scope of the invention as set forth in the appended claims.

Instead of manually withdrawing the sleeve 19 or the slide member 54 to enable the pivotal fingers to be unlocked said withdrawal may be effected by other means such as, for example, by mechanical means or by electrically operated means as in the case where the couplings are used for relatively large members.

The coupling of the present invention may be used for many widely different purposes, such as for example, dog head and collar connections, detachably connecting ship's furniture to decks, the coupling of rail or road vehicles, the coupling of bombs to bomb carrying and release means from aircraft, or again for safety straps for parachute harness. As other examples reference may be made to its use in association with a support for collapsible bunks, motor car bonnets, and life belts, or again as a door lock.

I declare that what I claim is:

1. A coupling of the snap type including male and female parts, said female part including a socket provided with closure means having an aperture therethrough, a pair of bell-crank fingers pivoted intermediate the ends thereof to one end of said male part, said fingers having latching arms and locking arms provided with shoulders, a longitudinally displaceable member mounted on said male part, and spring means maintaining said displaceable member abutting against said locking arms for normally holding said latching arms in a position permitting them to extend through the aperture in said closure means when the parts are separated, portions of said fingers being engageable with said female part upon movement of said parts toward one another into coupling position for angularly displacing the fingers to a position with said latching arms disposed within said socket in rear of said closure means, and said displaceable member being shaped to overlie the shoulders on said locking arms when the parts are coupled together for positively maintaining said latching arms in rear of said closure means whereby any force tending to separate the parts is assumed by said displaceable member.

2. A coupling of the snap type including a pair of parts adapted to be coupled together, one of said parts including a socket provided with closure means having an aperture therethrough, a pair of bell-crank fingers pivoted intermediate the ends thereof to one end of the other of said parts, said fingers having latching arms and locking arms provided with shoulders, a longitudinally displaceable member mounted on the part carrying said fingers, and spring means maintaining said displaceable member abutting against said locking arms for normally holding said latching arms in a position permitting them to extend through the aperture in said closure means when the parts are separated, the shoulders on said locking arms overlying the closure means when the parts are separated and being engageable with the edges of said closure means around the aperture therethrough upon movement of said parts toward one another into coupling position for angularly displacing the fingers to a position with said latching arms disposed within said socket in rear of said closure means, and said displaceable member being shaped to overlie the shoulders on said locking arms when the parts are coupled together for positively maintaining said latching arms in rear of said closure means whereby any force tending to separate the parts is assumed by said displaceable member.

3. A coupling of the snap type including a pair of parts adapted to be coupled together, one of said parts including a socket provided with closure means having an aperture therethrough, a pair of bell-crank fingers pivoted intermediate the ends thereof to one end of the other of said parts, said fingers having latching arms and locking arms provided with shoulders at one side thereof and with curved camming edges at the other side thereof, a longitudinally displaceable member mounted on the part carrying said fingers, and spring means maintaining said displaceable member abutting against the curved camming edges on said locking arms for normally holding said latching arms in a position permitting them to extend through the aperture in said closure means when the parts are separated, the shoulders on said locking arms overlying the closure means when the parts are separated and being engageable with the edges of said closure means around the aperture therethrough upon movement of said parts toward one another into coupling position for angularly displacing the fingers to a position with said latching arms disposed within said socket in rear of said closure means, and said displaceable member being shaped to overlie the shoulders on said locking arms when the parts are coupled together for positively maintaining said latching arms in rear of said closure means whereby any force tending to separate the parts is assumed by said displaceable member.

4. A coupling of the snap type, including a pair of parts adapted to be coupled together, one of said parts including a socket provided with closure means having an aperture therethrough, a pair of bell-crank fingers pivoted intermediate the ends thereof to one end of the other of said parts, said fingers having latching arms and locking arms provided with shoulders at one side thereof and with curved camming edges at the other side thereof, a longitudinally displaceable member mounted on the part carrying said fingers, spring means maintaining said displaceable member abutting against the curved camming edges on said locking arms for normally holding said latching arms in a position permitting them to extend through the aperture in said closure means when the parts are separated, and stop means on the part carrying said fingers for limiting movement of said latching arms toward one another, the shoulders on said locking arms overlying the closure means when the parts are separated and being engageable with the edges of said closure means around the aperture therethrough upon movement of said parts toward one another into coupling position for angularly displacing the fingers to a position with said latching arms disposed within said socket in rear of said closure means, and said displaceable member being shaped to overlie the shoulders on said locking arms when the parts are coupled together for positively maintaining said latching arms in rear of said closure means whereby any force tending to separate the parts is assumed by said displaceable member.

5. A coupling of the snap type including a pair of parts adapted to be coupled together, one of said parts including a socket provided with closure means having an aperture therethrough, a pair of bell-crank fingers pivoted intermediate the ends thereof to one end of the other of said parts, said fingers having latching arms and locking arms provided with shoulders, a longitudinally displaceable sleeve member carried by and surrounding the part carrying said fingers, and spring means carried by the part carrying said fingers and maintaining said displaceable sleeve member abutting against said locking arms for normally holding said latching arms in a position permitting them to extend through the aperture in said closure means when the parts are separated, the shoulders on said locking arms overlying the closure means when the parts are separated and being engageable with edges of said closure means around the aperture therethrough upon movement of said parts toward one another into coupling position for angularly displacing the fingers to a position with said latching arms disposed within said socket in rear of said closure means, and said displaceable sleeve member having a depending skirt portion adapted to extend into said aperture and adapted to enclose the shoulders on said locking arms when the parts are coupled together for positively maintaining said latching arms in rear of said closure means whereby any force tending to separate the parts is assumed by said displaceable sleeve member.

6. A coupling, as claimed in claim 2, wherein the parts to be coupled are relatively flat and the displaceable member is in the form of a flat slide.

7. A coupling, as claimed in claim 1, wherein the socket in the female part consists of a pair of plates maintained in spaced parallel relationship by distance pieces.

FREDERICK ARTHUR CLARKE.